United States Patent
Tsai et al.

(10) Patent No.: US 7,848,615 B2
(45) Date of Patent: Dec. 7, 2010

(54) MEDIUM FOR STORING SUBTITLE DATA STRUCTURE OF AN AUDIO/VIDEO PROGRAM AND METHOD FOR DISPLAYING THE SAME

(75) Inventors: Meng-Han Tsai, Taipei (TW); Wei-Zheng Lu, Chiayi (TW); Guo-Zua Wu, Taichung (TW); Kun-Da Wu, Nantou County (TW); Jau-Jiu Ju, Hsinchu Hsien (TW); Der-Ray Huang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 1154 days.

(21) Appl. No.: 11/309,035

(22) Filed: Jun. 12, 2006

(65) Prior Publication Data

US 2007/0140655 A1    Jun. 21, 2007

(30) Foreign Application Priority Data

Dec. 16, 2005    (TW) .............................. 94144669 A

(51) Int. Cl.
*H04N 7/00*    (2006.01)
(52) U.S. Cl. .............................. 386/95; 386/46; 386/52; 386/69; 715/256; 348/239
(58) Field of Classification Search .................. 386/95, 386/46
See application file for complete search history.

(56) References Cited

U.S. PATENT DOCUMENTS

| 5,621,469 A | 4/1997 | Monta et al. |
| 6,253,025 B1 * | 6/2001 | Kitamura et al. ............ 386/125 |
| 2005/0105890 A1 * | 5/2005 | Chung et al. .................. 386/95 |

FOREIGN PATENT DOCUMENTS

| CN | 1348588 | 5/2002 |
| CN | 1586070 | 2/2005 |
| TW | 462040 | 11/2001 |
| TW | 522379 | 3/2003 |

* cited by examiner

*Primary Examiner*—Thai Tran
*Assistant Examiner*—Girumsew Wendmagegn
(74) *Attorney, Agent, or Firm*—Jianq Chyun IP Office

(57) ABSTRACT

The present invention provides a medium for storing a subtitle data structure of an audio/video program and a method for displaying the same. The subtitle data structure of the audio/video program includes a plurality of character packages and a background image package, wherein each character package further has a header that includes the start and the end of a presenting time stamp (PTS), X-Y coordinates of the character, X length, Y length and a color (or colors) of the character, as well as pixel data for displaying the character. Compared with prior art, using the subtitle data structure of the present invention can considerably save the required medium capacity for storing the subtitle data.

8 Claims, 5 Drawing Sheets

MEDIUM FOR STORING SUBTITLE DATA STRUCTURE OF AN AUDIO/VIDEO PROGRAM AND METHOD FOR DISPLAYING THE SAME

CROSS-REFERENCE TO RELATED APPLICATION

This application claims the priority benefit of Taiwan application serial no. 94144669, filed on Dec. 16, 2005. All disclosure of the Taiwan application is incorporated herein by reference.

BACKGROUND OF THE INVENTION

1. Field of Invention

The present invention relates to a recording media storing an audio/video program and a method for playing the audio/video program. More specifically, the present invention relates to a recording media storing a subtitle data structure of the audio/video program and the method for displaying the subtitle data of the audio/video program.

2. Description of Related Art

Among various recording media, a compact disk (CD) is characterized with the advantages of its high capacity, low cost and portability, etc, and thus has been widely used in many different fields including storing data, listening music and watching movies. To be adapted for the characteristics of the CD and increase the reliability of reading CD data, when storing data on a pre-recording CD, if the encoded data is 1, then the recording surface with an organic dye is directly heated by a laser beam (775 nm~795 nm) output from a high power semiconductor laser, thereby burning the recording surface to form a data pit, whereas, if the encoded data is 0, no data pit is formed.

When a CD player reads the CD at a lower power laser beam, since the data pit and the un-burnt recording surface of the CD have different reflection indexes, the data pit absorbs a portion of the laser beam, while the un-burnt recording surface doesn't absorb the laser beam so that the CD player can reproduce the original encoded digital data (i.e. a series of information formed of 0 and 1) based on the different reflection result.

At present, the development of CD technology advances to be a DVD (digital versatile disk) with a capacity up to several GBs and capable of storing a movie program. When playing the audio/video program, a subtitle is also displayed on the bottom of a screen. The conventional method of displaying a subtitle is described below. With reference to FIG. 1A, it shows a block diagram for a conventional display flow of the single subtitle. In fact, the playing of the DVD is performed by sequentially pasting stored images on the screen. For example, a single subtitle package corresponding character A and the rest blank area of the screen is read from a recording medium R1 and then decoded to be a subtitle video S1 displayed on the screen. In the mean time, a background package A/V (Audio/Video) is read from the recording medium R1, and a decoded background video B1 (its corresponding image includes a cloud 2 and a horse) is displayed on the screen, and the subtitle video S1 and the background video B1 are overlaid by the use of a synthesizer M to form an output video O1. Next, with reference to FIG. 1B, it shows a schematic block diagram of a conventional switching display flow of a plurality of subtitles, wherein FIG. 1A's corresponding subtitle data structure on the recording media is shown in the bottom figure of FIG. 1B. For example the display time of character A starts from $t_{As}$ and ends at $t_{Ae}$, this period of time is called presenting time stamp (PTS) which is stored in a header of a package F-P1 for displaying an image 1. Similarly, the display time of character B starts from $t_{Bs}$ and ends at $t_{Be}$, and the display time are stored in a header of a package F-P2 for displaying an image 2. As shown in FIG. 1A, the conventional subtitle video S1 of the character A and the decoded background video B1 are overlaid through a first synthesizer M1 to form a first output video O1. Next, when the time axis runs to $t_{Ae}$, the first output video O1 is erased by a first eraser E1, and the display flow of another character B is repeated. That is, a single subtitle package for displaying the character B and the rest blank area of the screen are read from the recording medium, as well as the decoded subtitle video S2 and the decoded background video B1 are overlaid by a second synthesizer M2 to form a second output video O2 that is to be displayed on the screen. However, according to the PTS of the character B, its display is terminates and the character B disappears (executed by a second eraser) at $t_{Be}$, and eventually only the background video is output as a third output video O3. As obviously shown in FIG. 1B, the subtitle video S1 has the same image structure as the subtitle video S2, i.e. within the whole substrate frame 1 (as shown by a dash line), the rest area except the character A or B is all blank. Since the blank area in the screen also requires blank pixel information corresponding to the blank area to be encoded and compressed into the DVD, therefore the capacity of the medium (for example DVD) for storing the subtitle is significantly increased.

To solve the problem of the conventional technology, therefore it is necessary to provide a medium for storing the subtitle data structure of an audio/video program, and the medium can significantly reduce the capacity needed to store the subtitle. Moreover, there exists a need for a method of playing the subtitle of the audio/video program.

SUMMARY OF THE INVENTION

An object of the present invention is to provide a recording medium for storing a subtitle data structure of an audio/video program and a method for playing the subtitle data of the audio/video program. Wherein the subtitle data structure of the audio/video program includes a plurality of character packages and a background package, and each character package has a header including information of the start and the end of a presenting time stamp (PTS) of the character, the X and Y coordinates of the character, the length of X length, the length of Y, and the color of the character, as well as the pixel information package for displaying this character. With the subtitle data structure of the audio/video program, the recording medium can save the capacity needed to store the subtitle data. Meanwhile, when the subtitle data of the audio/video program is displayed, a plurality of the character packages stored in the recording medium is read, and displayed on a screen for a period of time according to the PTS of the character stored in the header.

A further object of the present invention is to provide a medium for storing a subtitle data structure of an audio/video program and a method for playing the subtitle data of the audio/video program. Herein the subtitle data structure can be a first language character data structure or a second language character data structure. In other words, the present invention can provide a user with an option of his/her favor language. The subtitle data structure of the present invention includes the first language character package, a background package and the second language character. Herein the first language character package includes a first header for storing a first PTS indicating start and end information and screen display coordinates X, Y information of the first language character, followed by pixel information for displaying the first language character. The second language character package includes a second header for storing a second PTS indicating the start and the end information and screen display coordinates X, Y information of the second language character, followed by pixel information for displaying the second language character. Therefore, using the subtitle data structure of the present invention, the effect of significantly saving the recording media (for example video disk, VD) capacity needed to store the subtitle can be achieved.

A further object of the present invention is to provide a method for playing a subtitle data of an audio/video program using the above subtitle data structure. First, each of N packages is read from the recording medium, and in each package of the N packages, the pixel information for displaying the character and the header are separated. Next, the pixel information (for displaying the character) package of each package, is sequentially stored in a video data buffer area, and the header of each package is sequentially stored in an information buffer area. A first pixel (i.e. the first character) information package and the first header are read from the video data buffer area. Moreover, a system timing clock is compared with the start of the PTS stored in the first header. If the system timing clock≧the start of the PTS, then the first character is pasted on the screen for a period according to the information stored in the information buffer area. If the system timing clock=the end of the PTS, then the display of the first character is stopped by a play control program, and a second character video data package is then read from the video data buffer area so as to paste the second character on the screen for a period according to its corresponding information in the information buffer area.

These and other exemplary embodiments, features, aspects, and advantages of the present invention will be described and become more apparent from the detailed description of exemplary embodiments when read in conjunction with accompanying drawings.

DESCRIPTION OF EMBODIMENTS

Figure 2A:
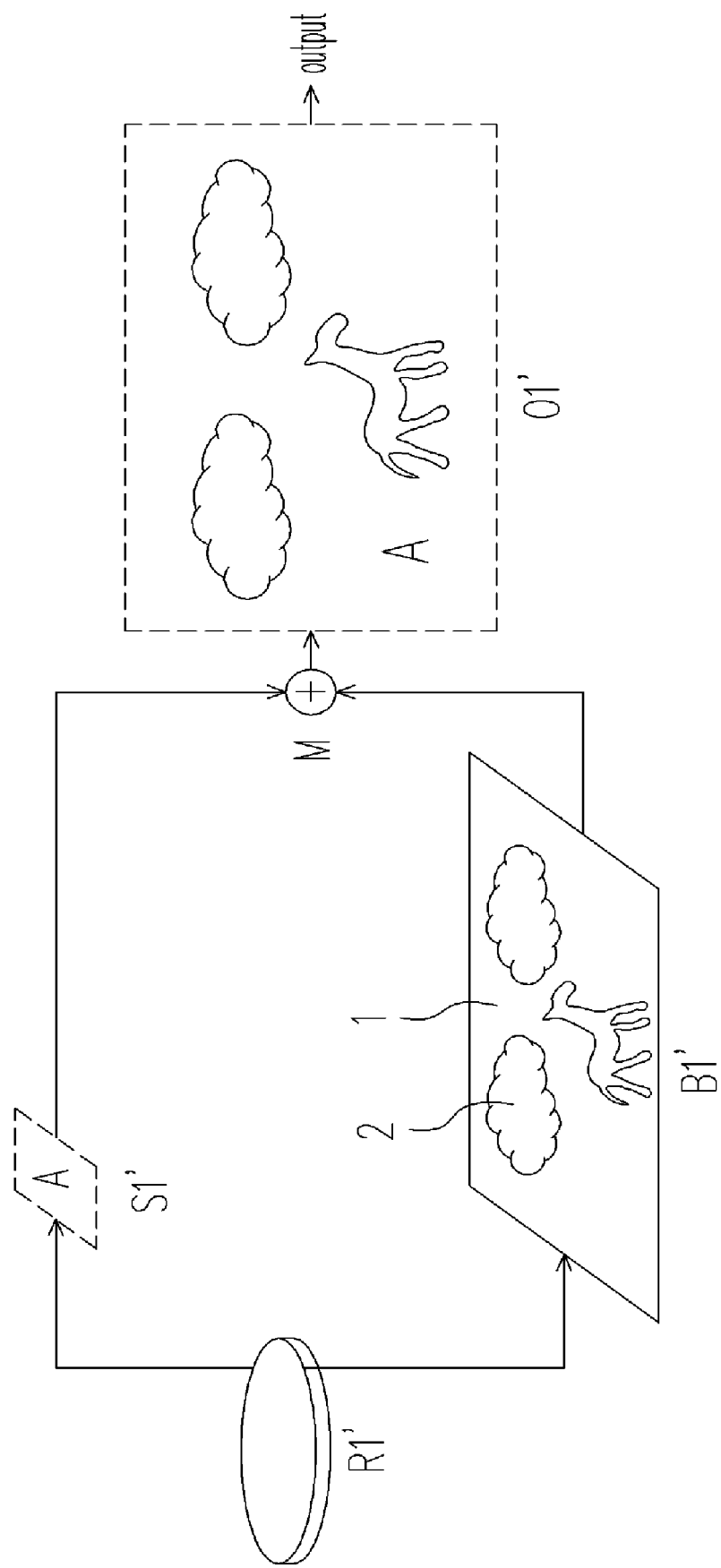
FIG. 2A is a schematic block diagram of a display flow of a single subtitle according to an embodiment of the present invention.
Figure 2B:
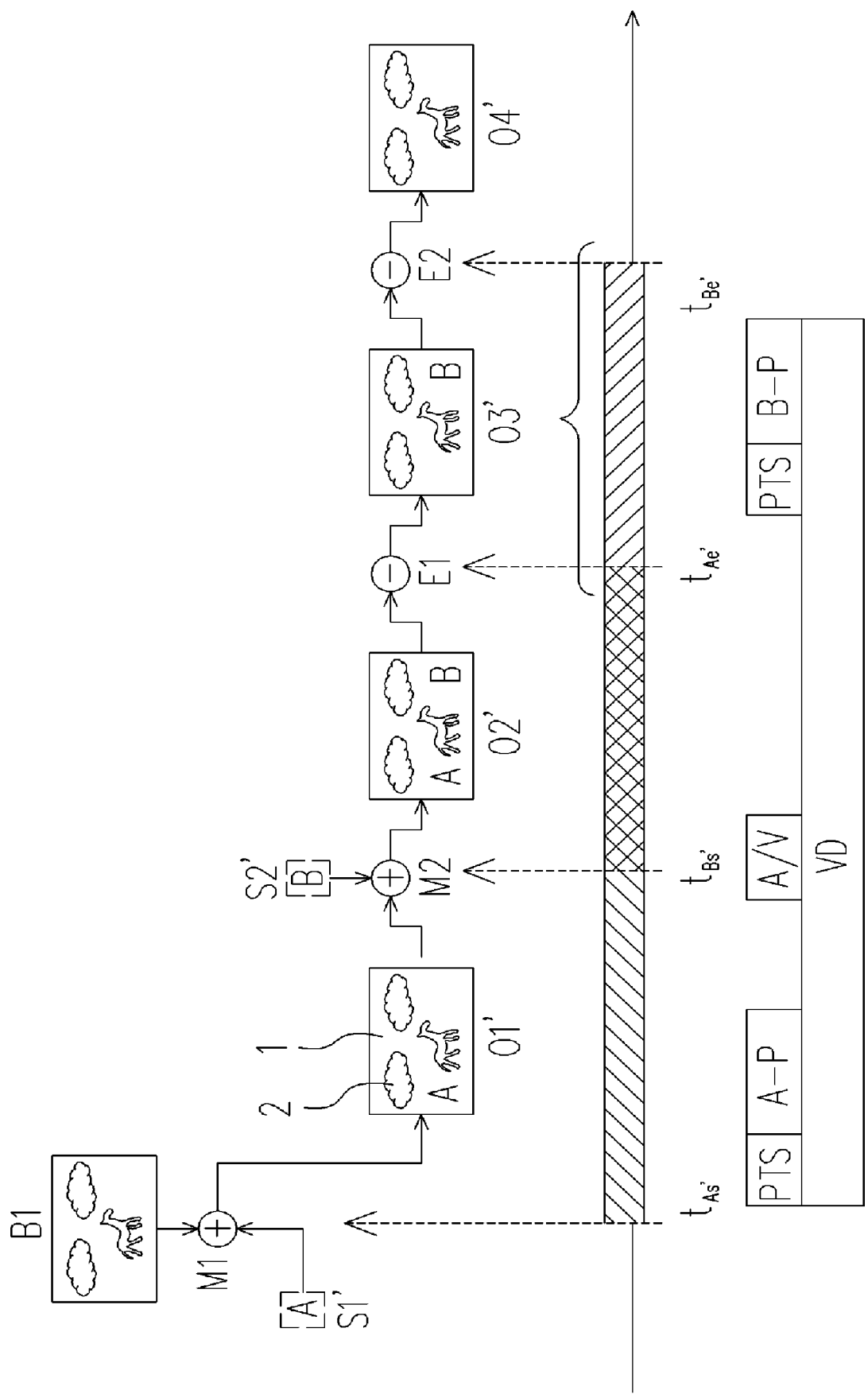
FIG. 2B is a schematic block diagram of a switch display flow of a plurality of subtitles according to an embodiment of the present invention.

With reference to FIG. 2B, it schematically illustrates a recording medium for storing a subtitle data structure of an audio/video program according to an embodiment of the present invention. The recording medium can be an audio/video disk (or referred as VD). The video program subtitle data structure of the present embodiment includes a plurality of character packages and a background package, and each character package includes a header with a PTS indicating the start and the end of displaying the character, and the pixel information package for displaying the character. To make the present invention easier to be comprehended, a character A is used as an example. The subtitle data structure of the recording medium includes a pixel information package A-P of the character A and a header with the PTS of the character, as well as a background package A/V. Next, with reference to FIG. 2A, a subtitle package including pixel information only corresponding to display a character A but no blank area is read from the recording medium R1', and decoded to display a subtitle video S1' on the screen (please note that a very small area is occupied on the screen). In the mean time, the background package A/V is further read from the recording medium R1', and decoded to display a background video B1' (the image includes a cloud 2 and a horse) on the screen. The subtitle video S1' and the background video B1' are then overlaid by a synthesizer M to form an output video O1'.

Figure 1A:
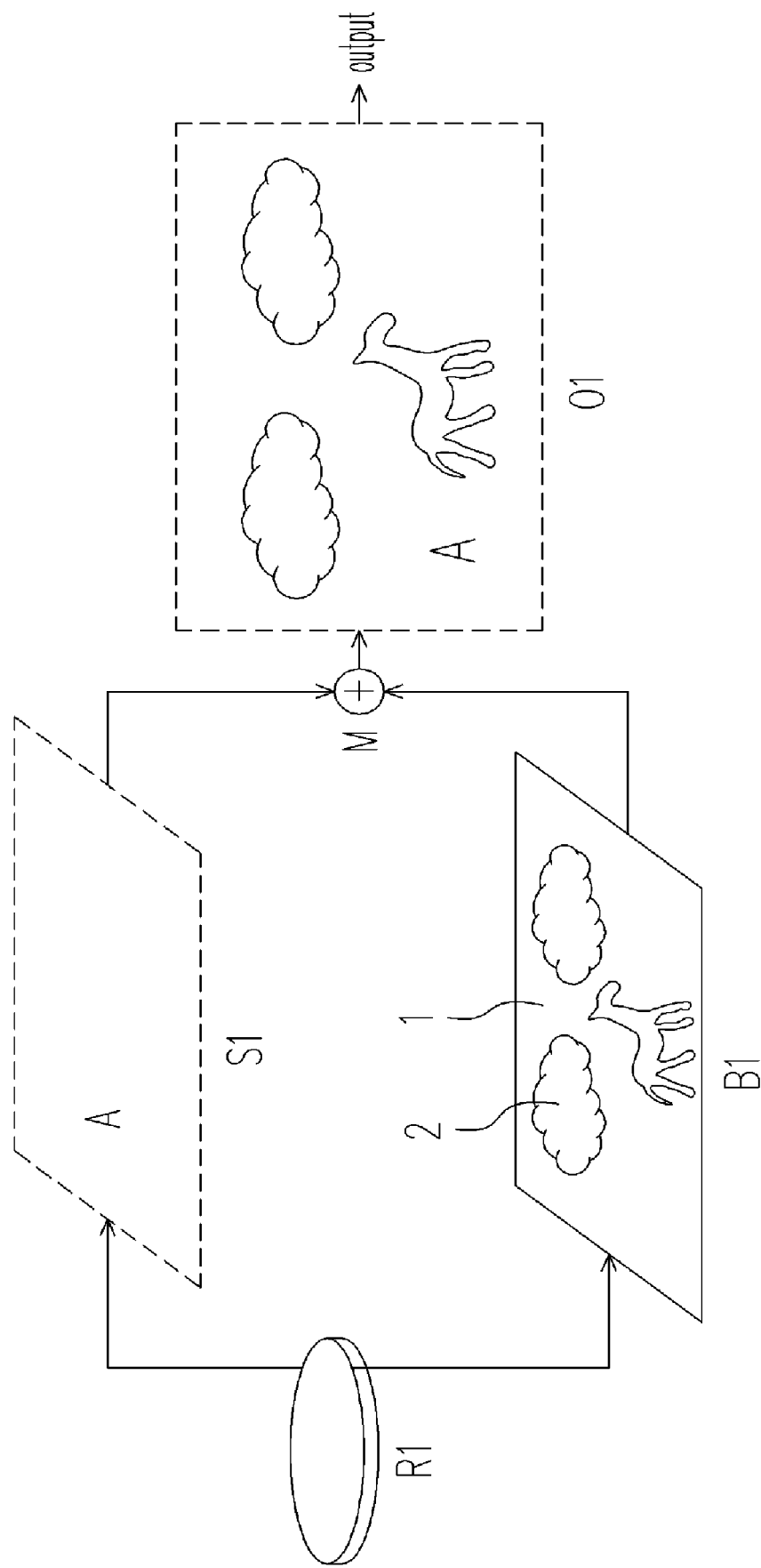
FIG. 1A is a schematic block diagram of a conventional display flow of a single subtitle.
Figure 1B:
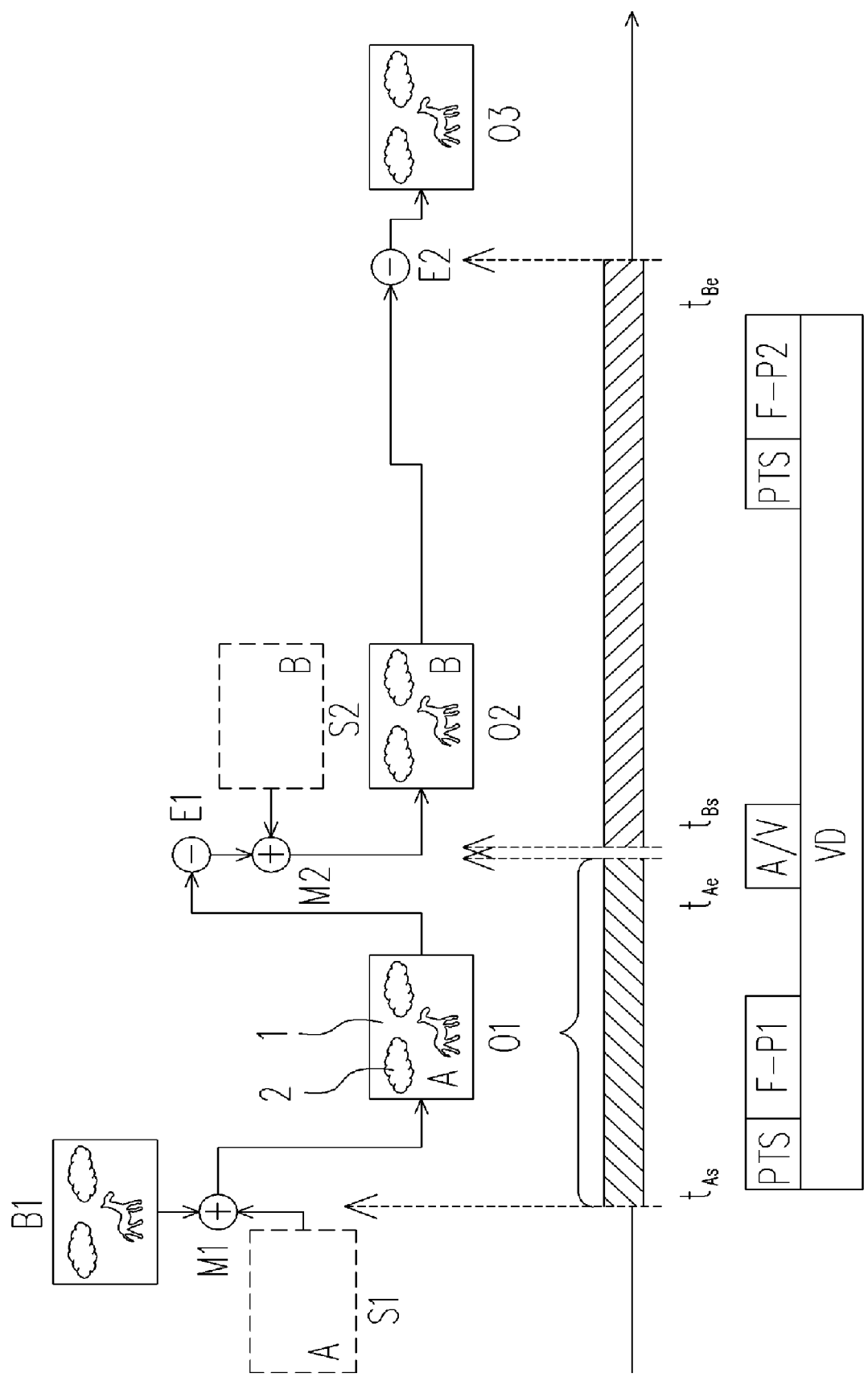
FIG. 1B is a schematic block diagram of a conventional switch display flow of a plurality of subtitles.

Comparing FIG. 1A with FIG. 2A, it can be seen that the data structure for storing the audio/video program according to the present invention has the advantage of saving the recording media's capacity required by the blank pixel information corresponding to display the blank area. When the PTSs of different characters are to be displayed, referring to FIG. 2B, wherein the bottom diagram of FIG. 2B illustrates a recording medium structure, for example a VD, includes a pixel information package A-P for displaying a character A and a header including the PTS of the character, a background package A/V, and a pixel information package B-P for displaying a character B and its header including the PTS for displaying the character. It is clearly shown from the time axis in FIG. 2B, that the PTS of the character A is from $t=t_{As'}$ to $t=t_{Ae'}$, and the PTS of the character B is from $t=t_{Bs'}$ to $t=t_{Be'}$. Therefore the PTS that the character A and character B are both presented is from t=tBs' to $t=t_{Ae'}$. In other words, a video S1' with the character A and the background video B1' are overlaid by a synthesizer M1 to form an output video O1'. When the time axis runs to $t=t_{Bs'}$, the video S1' with the character B and the output video O1' are overlaid by a second synthesizer M2 to form a second output video with the characters A and B both presented as shown in O2'. Again, when the time axis runs to $t=t_{Ae'}$, the character A is erased by a first eraser and disappears, and only the third output video O3' with the character B is output. Since the PTS of the character B is from $t=t_{Bs'}$ to $t=t_{Be'}$, therefore when the time axle runs to $t=t_{Be'}$, the character B is erased by a second eraser and disappears, and at last only the background video of the output video O4' is output.

Compared with the conventional DVD subtitle data structure, in the present invention, since the pixel information package A-P of the character A and the pixel information package B-P of the character B only include the pixel information of the character A and the character B, and the corresponding pixel information of the rest blank area in the substrate frame 1 is not necessarily to be encoded and compressed in the recording media, therefore the recording media (for example VD) capacity needed for storing the subtitle can be significantly reduced.

Figure 3:
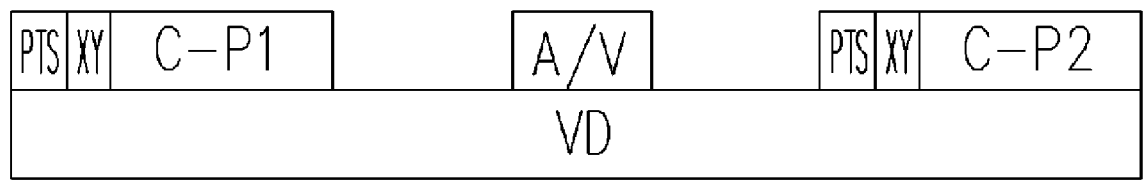
FIG. 3 is a subtitle data structure storing the information program according to an embodiment of the present invention.

Meanwhile, the character A and character B in FIG. 2B can also be applied when the recording media provides subtitles of a plurality of languages. In such case, the subtitle data structure includes a first language character package (corresponding to the character A package), a background package A/V and a second language character package (corresponding to the character B package) so that the data structure of FIG. 2B becomes the data structure of FIG. 3. With reference to FIG. 3, wherein the first language character package includes a header for storing the PTS for displaying the first language characters, and the screen display coordinates X, Y information of the first language character, and the pixel information package C-P1 displaying the first language character. The second language character package includes a header for storing the PTS for displaying the second language characters, and the screen display coordinates X, Y information, and the pixel information package C-P2 displaying the second language character.

If a user, for example, selects the first language (for example Chinese) subtitle, then when the recording medium is played, the play control program then only reads the first language character package and decodes the pixel information package C-P1 thereof to display the first language characters on the screen. Since the pixel information of the first language character package in the present invention only has the pixel information of the first language character without needing to encode and compress the corresponding pixel information of the rest blank area in the substrate frame 1 on the recording medium, and so does the second language character package. Therefore, in the present invention, compared with the conventional method, the subtitle data structures switched between a plurality of languages can significantly reduce the capacity needed by the recording media to store the subtitle. Therefore by using the subtitle data structure of the present invention, the effect of greatly reducing the capacity needed by the recording media (for example VD) to store the subtitle can be achieved.

Figure 4:
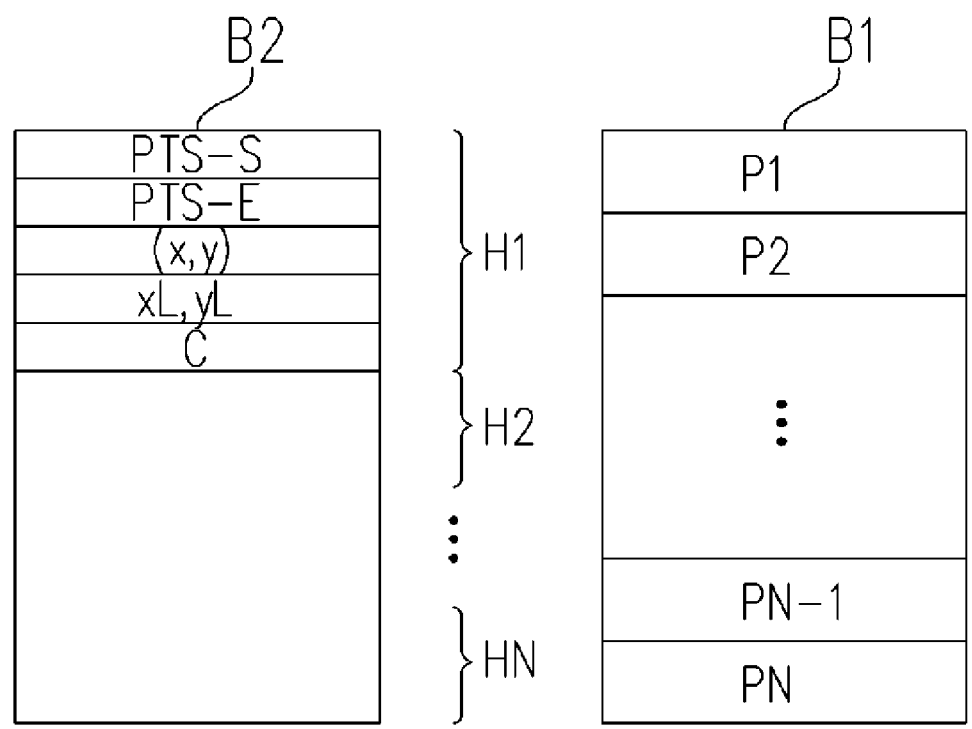
FIG. 4 schematically illustrates a video data buffer area B1 having N pixel information PN and an information buffer area B2 having N headers HN.

The present invention further provides a method of playing the subtitle data of the audio/video program of the recording media. The method includes the following steps. First, N character packages are read in sequence from the recording media, and in the mean time, the character displaying pixel information package and the header in each character package are separated. Next, as shown in FIG. 4, the character displaying pixel information packages separated in sequence are sequentially stored in a video data buffer area B1 and are sequentially indexed as a first pixel information package P1, a second pixel information package P2, . . . until a Nth pixel information package PN. And the headers separated in sequence are stored in sequence in an information buffer area B2 and are sequentially indexed as a first header H1, a second header H2, . . . until a Nth header HN. Herein the headers include the start of the PTS (PTS-S) and the end of the PTS (PTS-E) information, the screen display coordinates X, Y (x, y) information of the character, X length (XL), Y length (YL), and the display color (C) information of the character.

Next, the first pixel information package P1 (which has the pixel of the first character) and the first header are read from the video data buffer. The system timing clock (i.e. the system clock of the recording media player) is compared with the start of the PTS in the first header, if the system timing clock$\geqq$=PTS start (indicating the recording medium is still playing), then the first character is pasted on the screen according to the information in the information buffer area. If the system timing clock=the end of the PTS, then a play control program stops displaying the first character. Then the previous step is repeated to display the second character on the screen until the Nth character is displayed on the screen.

To summarize, compared with the conventional method, the present invention has the following advantages:

1. Compared with the conventional DVD subtitle data structure, the pixel information of the characters in the audio/video program subtitle data structure of the present invention does not include the corresponding pixel information of the rest blank area in the substrate frame, therefore the capacity required by the recording media (for example VD) to store the subtitle can be significantly reduced.

2. In the subtitle data structure of the recording medium capable of being switched between a plurality of languages, since the pixel information of the first language character package of the present invention only includes the pixel information of the first language character without encoding and storing the corresponding pixel information of the rest blank area in the substrate frame on the recording medium, therefore compared with the conventional method, the multi-language-switched subtitle data structure of the present invention significantly reduces the capacity needed by the recording medium (for example VD) for storing the subtitles.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A non-transitory recording medium storing a subtitle data structure of an audio/video program, wherein the subtitle data structure comprises:

a plurality of character packages, each of which has a header comprising a PTS indicating the start and the end of displaying a character, and a pixel information package for displaying the character; and a background package, using the pixel information package for displaying the character without comprising corresponding pixel information for displaying the rest blank area in a substrate frame, thereby significantly reducing the capacity required by the non-transitory recording medium to store the subtitle data.

2. The non-transitory recording medium storing a subtitle data structure of an audio/video program as claimed in claim 1, wherein the non-transitory recording medium is a video disk (VD).

3. The non-transitory recording medium storing a subtitle data structure of an audio/video program as claimed in claim 1, wherein the header further comprises screen display coordinates X, Y information of the character, X length, Y length and display color information of the character.

4. A non-transitory recording medium storing a subtitle data structure of an audio/video program, the subtitle data structure being switched between two language subtitles, wherein the subtitle structure comprises:

a first language character package, comprising a first header including a first PTS indicating the start and the end of displaying the first language character, screen display coordinates X, Y information of the first language character, and pixel information of displaying the first language character;

a background package;

a second language character package, comprising a second header including a second PTS indicating the start and the end of displaying the second language character, screen display coordinates X, Y information of the second language character, and pixel information of displaying the second language character.

5. The non-transitory recording medium storing a subtitle data structure of an audio/video program as claimed in claim 4, wherein the non-transitory recording medium is a video disk (VD) recording medium is a VD.

6. The non-transitory recording medium storing a subtitle data structure of an audio/video program as claimed in claim 4, wherein the header further comprises X length, Y length and display color information of the character.

7. A method for playing a recording medium comprising a subtitle data of an audio/video program, comprising:

reading N character packages from the recording medium in sequence, and in the mean time, sequentially separating a pixel information package for displaying a character and a header from each of the N character packages;

sequentially storing the sequentially separated pixel information packages for displaying the character in a video data buffer area and sequentially indexing the pixel information package as a first pixel information package, a second pixel information package, . . . until a Nth pixel information package, and sequentially storing the sequentially separated headers in an information buffer area and indexing these headers as a first header H1, a second header H2, . . . until a Nth header HN;

reading the first pixel information package (i.e. comprising the pixel information of the first character) and the first header from the video data buffer area;

comparing a system timing clock with the start of the PTS stored in the first header, if the system timing clock≧the start of the PTS, then pasting the first character on a screen for a period according to the information stored in the information buffer area; if the system timing clock=the end of the PTS, then stops displaying the first character through a play control program; and repeating the previous steps to display the second character on the screen until the Nth character has been displayed on the screen.

8. The method as claimed in claim 7, wherein the header comprises the PTS indicating the start and the end information, screen display coordinates X, Y information of the character, X length, Y length and display color information of the character.

* * * * *